United States Patent [19]

Matsuzaki

[11] Patent Number: 5,097,369
[45] Date of Patent: Mar. 17, 1992

[54] MAGNETIC HEAD AIR-BEARING SLIDER

[75] Inventor: Mikio Matsuzaki, Tokyo, Japan

[73] Assignee: TDK Corporation, Tokyo, Japan

[21] Appl. No.: 577,609

[22] Filed: Sep. 5, 1990

[30] Foreign Application Priority Data

Sep. 8, 1989 [JP] Japan .................................. 1-233806

[51] Int. Cl.$^5$ ............................................... G11B 5/60
[52] U.S. Cl. ............................................... 360/103
[58] Field of Search ................................... 360/103

[56] References Cited

U.S. PATENT DOCUMENTS

3,823,416  7/1974  Warner .
3,855,625 12/1974  Garnier .................... 360/103
4,218,715  8/1980  Garnier .
4,475,135 10/1984  Warner .
4,490,766 12/1985  Hill et al. .
4,670,806  6/1987  Ghose ........................ 360/103

Primary Examiner—A. J. Heinz
Attorney, Agent, or Firm—Oblon, Spivak, McClelland, Maier & Neustadt

[57] ABSTRACT

A magnetic head has a slider provided with reading/writing elements wherein the slider has a recessed portion for generating a negative pressure at a surface so that the bottom surface of the recessed portion is slanted at a predetermined grade toward the surface at the side of an air in-flowing end, and the bottom surface terminates at an end of the slider at the side of an air discharging end.

3 Claims, 7 Drawing Sheets

MAGNETIC HEAD AIR-BEARING SLIDER

BACKGROUND OF THE INVENTION

1. Field of the Invention

The present invention relates to a magnetic head having a negative pressure type slider. More particularly, the present invention relates to an improvement in a negative pressure type slider used for a magnetic head.

There has been used a flying type magnetic head for a magnetic disk apparatus for computers. The flying type magnetic head is adapted to read and write data by producing an air bearing function between a magnetic disk and the slider of the magnetic head while they are relatively moved at a high speed. In the magnetic head of this kind, there has been known a spring loading system and a negative pressure system wherein a negative pressure produced at the slider is utilized, as means to ensure a magnetic interface between a magnetic disk and the slider of the magnetic head. The present invention concerns the negative pressure type magnetic head between the above-mentioned two kinds of magnetic head.

Figure 11:
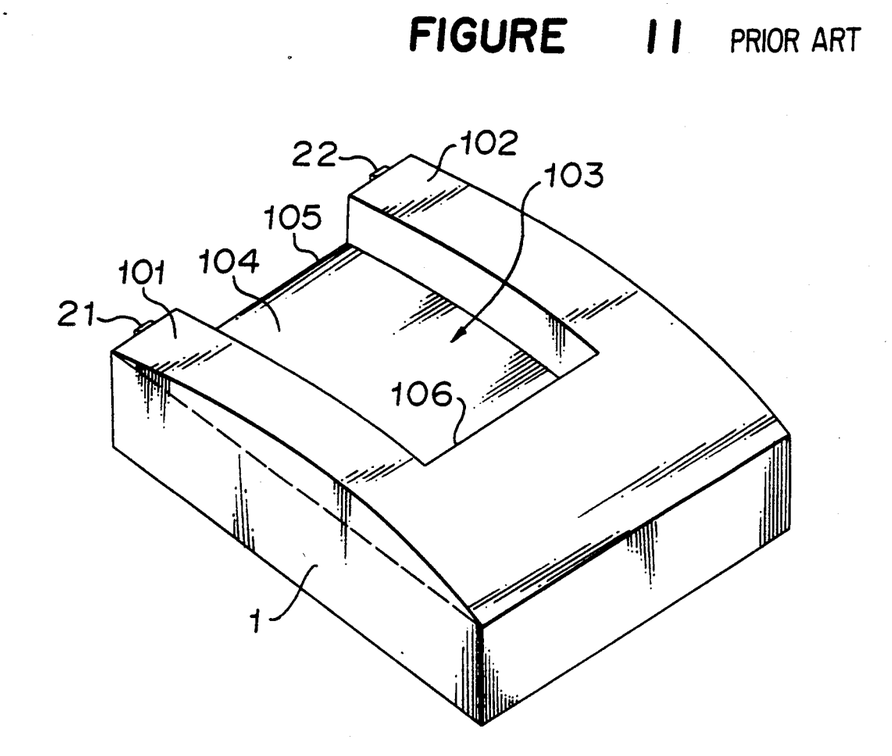
FIG. 11 is a perspective view of a conventional slider used for a magnetic head.

A negative pressure type magnetic head is a self-loading type magnetic head which utilizes a negative pressure produced at the slider, which has advantages that it is unnecessary to provide a spring loading mechanism and a low loading operation is allowed. As a conventional technique of the negative pressure type magnetic head, there has been known one disclosed, for instance, in Japanese Unexamined Patent Publication No. 35765/1983 (U.S. Pat. No. 4,420,780). FIG. 11 shows a magnetic head disclosed in the above-mentioned publication, wherein a reference numeral 1 designates a slider and numerals 21, 22 designate reading/writing elements. The slider 1 is composed of ceramics in which two rail portions 101, 102 are provided spaced apart from each other at its one surface and the reading/writing elements 21, 22 are respectively provided at an end portion of the rail portions 101, 102.

Further, a recessed portion 103 as a negative pressure producing area is formed between the rail portions 101, 102. The recessed portion 103 has a bottom surface 104 which terminates at an end 105 of the slider, and which terminates at the other end where a vertical wall surface 106 is formed so that the wall surface 106 sharply rises at an angle of about 90° toward a surface of the slider.

Figure 12:
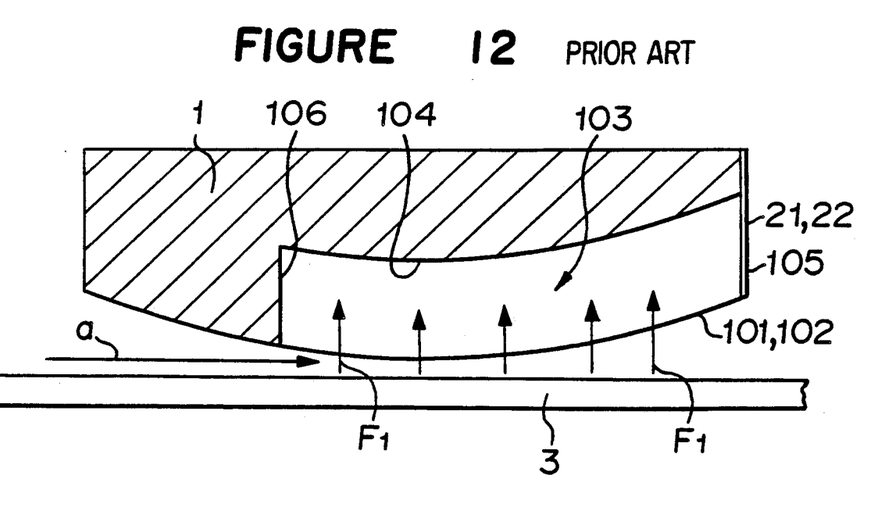
FIG. 12 is a diagram illustrating the function of the slider in a conventional magnetic head.

In the negative pressure type magnetic head as shown in FIG. 12, a side of the slider 1 where the reading/writing elements 21, 22 are formed is an air discharging side and the opposite side is an air inflowing side with respect to the air-flowing direction indicated by an arrow mark a. In operations, the slider 1 is attracted toward the magnetic disk 3 by a negative pressure $F_1$ produced at the recessed portion 103, whereby a small air bearing is formed.

In the magnetic head disclosed in Japanese Unexamined Patent Publication No. 35765/1983, however, the recessed portion 103 had to be formed by ion milling or the like and it was impossible to use a cutting means such as a wire saw, a rotating grindstone or the like because the recessed portion 103 as a negative pressure producing area had a vertical wall surface 106 which sharply rises at an angle of about 90° toward a surface of the slider at the air in-flowing side. Since the slider 1 was composed of ceramics which is difficult to process, it took much time to process the recessed portion of the slider by ion milling. Accordingly, there was a problem that processability was poor, whereby it was unsuitable for a large scale production.

SUMMARY OF THE INVENTION

It is an object of the present invention to provide a magnetic head with a slider wherein processing of a recessed portion for producing a negative pressure can be easy and efficiency of production is improved.

The foregoing and other objects of the present invention have been attained by providing a magnetic head having a slider provided with reading/writing elements wherein the slider has a recessed portion for generating a negative pressure at a surface so that the bottom surface of the recessed portion is slanted at a predetermined grade toward the surface at the side of an air in-flowing end, and the bottom surface terminates at an end of the slider at the side of an air discharging end.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
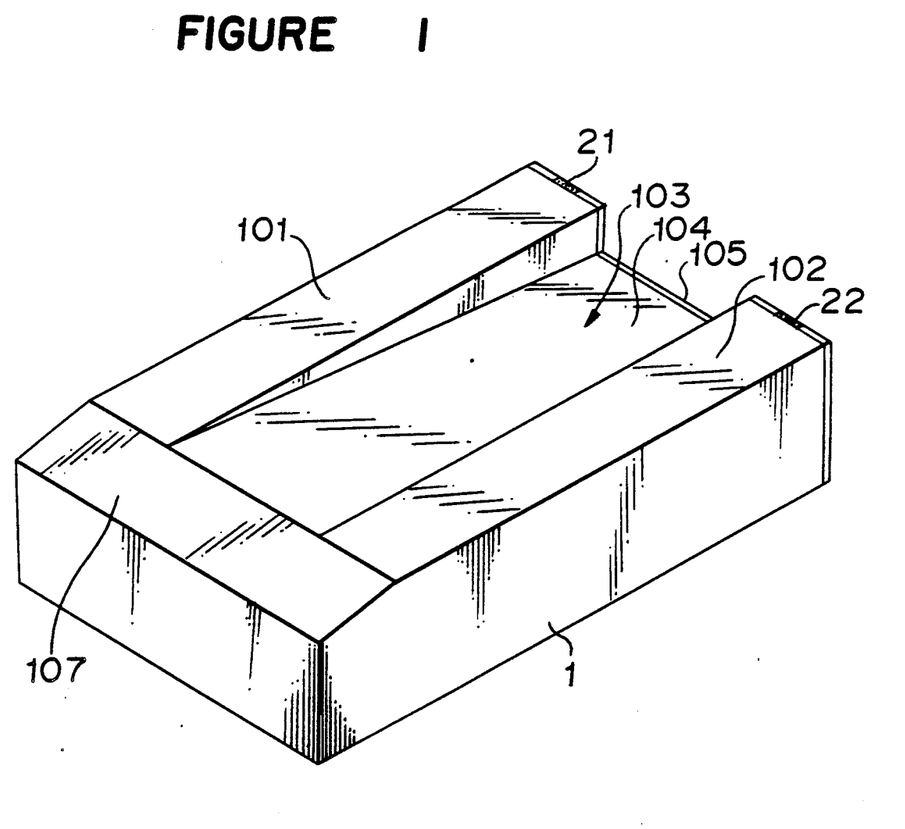
FIG. 1 is a perspective view of an embodiment of a slider used for the magnetic head of the present invention wherein the magnetic head is viewed from the side of a medium-opposing surface.
Figure 2:
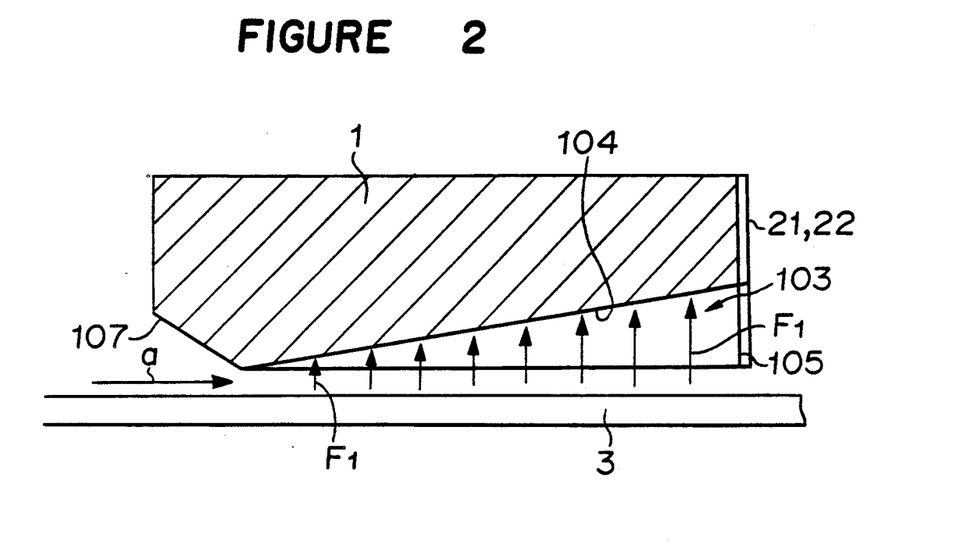
FIG. 2 is a diagram for illustrating the function of the slider in a magnetic disk apparatus.
Figure 3:
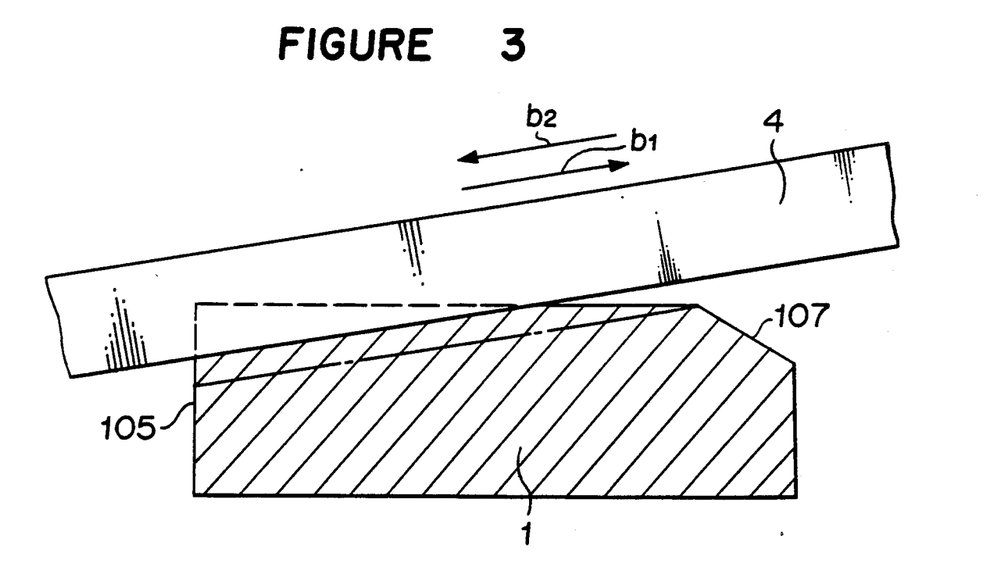
FIG. 3 is a diagram showing a processing step for processing a recessed portion in the magnetic head shown in FIG. 1.

Referring to the drawings wherein the same reference numerals designate the same or corresponding parts throughout the several views, and more particularly to FIGS. 1-3 thereof, there are shown a perspective view and diagrams of an embodiment of the magnetic head of the present invention. In FIGS. 1-3, a recessed portion 103 is formed in a slider 1 so as to generate a negative pressure when a magnetic head provided with the slider 1 is operated in association with a magnetic disk. The recessed portion 103 has a bottom surface 104 whose one end terminates at an end 105 of the slider 1 at an air discharging side, the bottom surface 104 constitutes a slanting surface which gradually rises at a gentle grade toward a surface opposing a magnetic disk, at an air inflowing side. In the slider of the magnetic head shown in this embodiment, the bottom surface 104 of the recessed portion 103 is, as a whole, a slanting surface which slants at a predetermined grade so that the depth of the bottom surface 104 becomes shallow toward the air in-flowing side.

Two rail portions 101, 102 are formed at both side portions of the recessed portion 103 along the air-flowing direction, and reading/writing elements 21, 22 are formed at the air discharging side of the rail portions 101, 102 of the slider 1. Further, a tapered surface 107 is formed at the air in-flowing side of the slider 1. The surface of the rail portions 101, 102 is flat. However, the surface of the rail portions 101, 102 may have a crown portion as in the conventional slider as shown in FIG. 11. The recessed portion 103 in FIG. 11 defined between the two rail portions 101, 102 is not a negative pressure producing portion, but constitutes merely a groove to escape air.

The reading/writing elements 21, 22 are respectively constituted by thin film reading/writing elements.

FIG. 2 is a diagram showing a state of the slider 1 as shown in FIG. 1, which is operated in association with a magnetic disk. In a combination of the slider 1 with the magnetic disk, a side of the slider where the tapered surface 107 is formed is shown as an air discharging side with respect to an air flowing direction (a), and the other side of the slider where the reading/writing elements 21, 22 are formed is shown as an air discharging side. During the operation of the slider and the magnetic disk, the slider 1 is attracted toward the magnetic disk 3 due to a negative pressure $F_1$ produced at the recessed portion 103, thus a small air bearing is produced.

As described above, the bottom surface 104 of the recessed portion 103 is a slanting surface which slants at a predetermined grade toward the medium opposing surface of the slider at the air in-flowing side and the bottom surface 104 terminates at the other end portion 105 of the slider 1 at the air discharging side. A preferred range of the predetermined grade is from 30' to 3 degrees. Accordingly, the recessed portion 103 can be formed with use of a wire saw to shave the recessed portion 103 as shown in FIG. 3. Therefore, the recessed portion 103 can be easily formed, and processability is improved. The recessed portion 103 is processed by moving the wire saw 4 in the directions of arrow marks $b_1$ and $b_2$.

Figure 4:
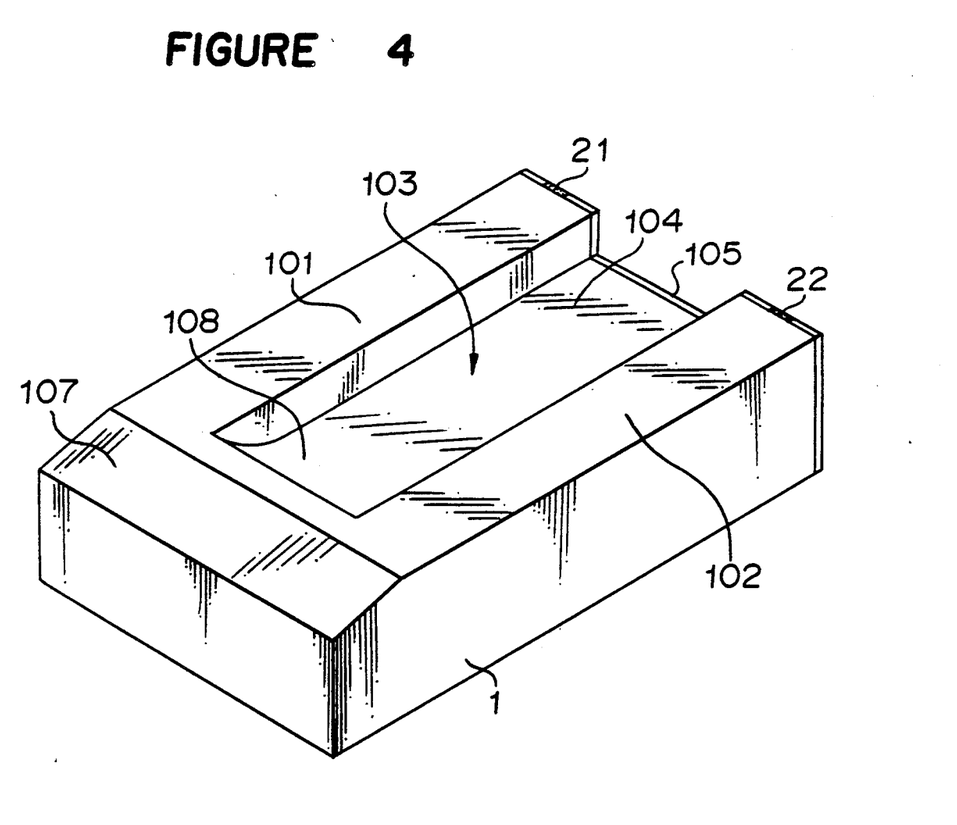
FIG. 4 is a perspective view of another embodiment of the slider of the magnetic head according to the present invention.
Figure 5:
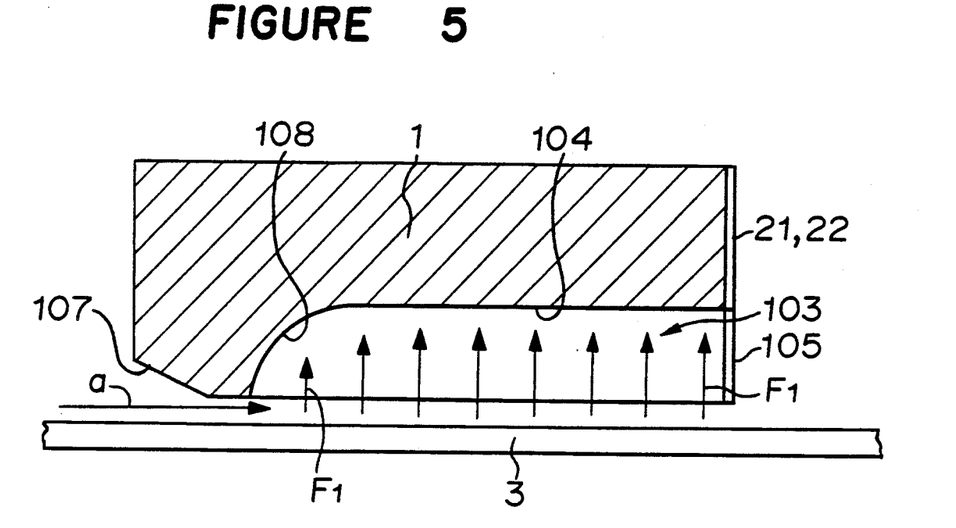
FIG. 5 is a diagram illustrating the function of the slider shown in FIG. 4.

FIG. 4 is a perspective view of a Slider used for a magnetic head of another embodiment of the present invention and FIG. 5 is a diagram showing a state of the slider combined with a magnetic disk 3. In this embodiment, the bottom surface 104 of the recessed portion 103 has a slanting surface 108 in which one end at the air in-flowing side is formed in an arc shape.

Figure 6:
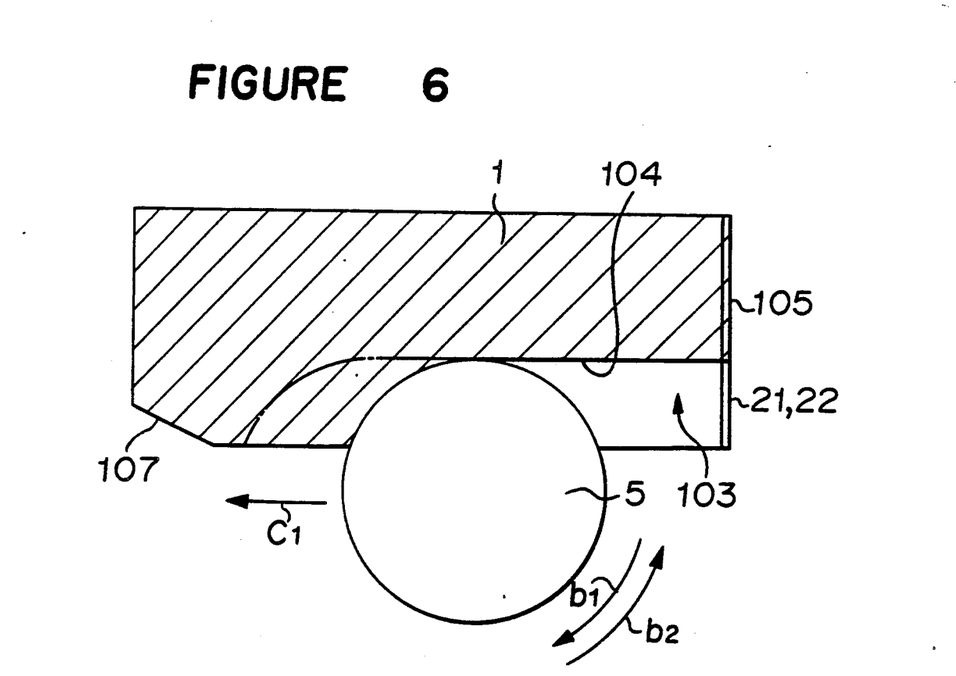
FIG. 6 is a diagram showing a processing step for processing a recessed portion in the magnetic head shown in FIG. 4.

In the slider of the magnetic head as shown in FIGS. 4 and 5, the recessed portion 103 is formed by shaving it with use of a rotating grindstone 5 as shown in FIG. 6. Accordingly, the recessed portion 103 for producing a negative pressure can be easily formed and processability is improved. The processing operation is conducted by moving the rotating grindstone 5 in the direction of an arrow mark $c_1$ while it is rotated in the direction of an arrow mark $b_1$ or $b_2$.

Other embodiments of the present invention will be described with reference to FIGS. 7-10.

Figure 7:
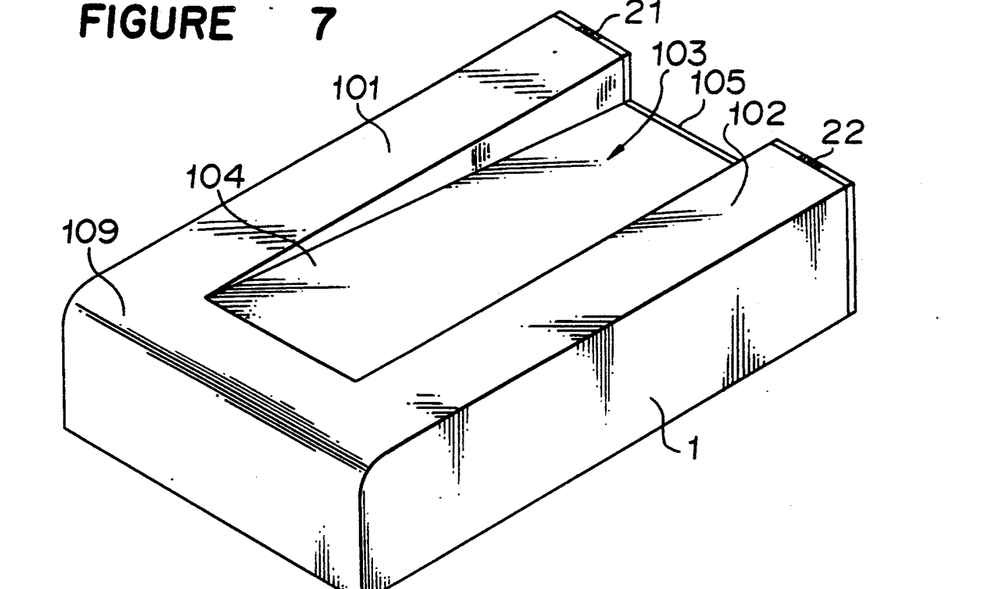
FIGS. 7 through 10 are respective perspective views of separate embodiments of the slider of the magnetic head according to the present invention.

The slider as shown in FIG. 7 is the same as those as shown in FIGS. 1 through 4 except that an edge portion 109 located at the border between the medium opposing surface of the slider 1 and the end portion at the air in-flowing side is formed in an arc shape and the tapered surface 107 as in the embodiments shown in FIGS. 1 through 4 is eliminated. The embodiment as shown in FIG. 7 suggests that there is any restriction by the presence or absence of the tapered surface 107.

Figure 8:
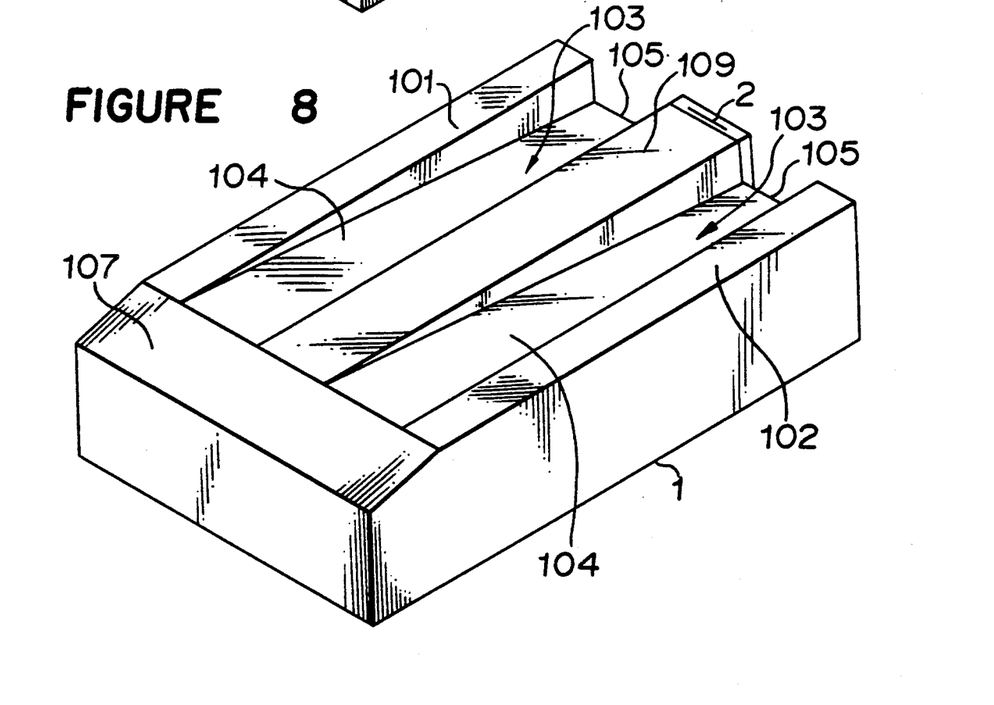

FIG. 8 shows another embodiment wherein a plurality of recessed portions 103, 103 are formed in the medium opposing surface of the slider. In FIG. 8, numerals 101, 102 and 109 designate rail portions and a numeral 2 designates a single reading/writing element. This embodiment suggests that a slider having a plurality of recessed portions is included in the present invention.

Figure 9:
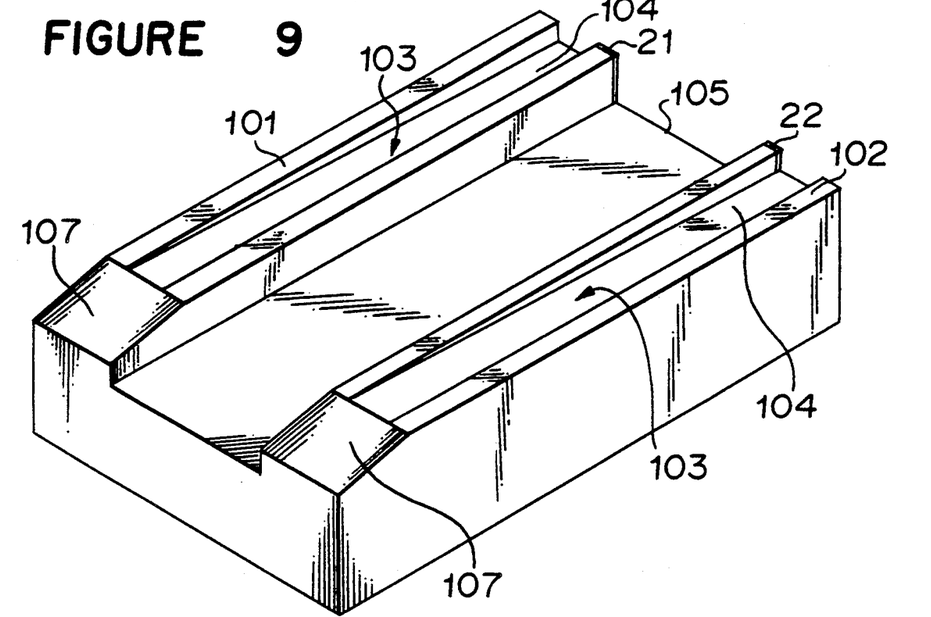

FIG. 9 shows another embodiment wherein a recessed portion 103 is formed in each of the rail portions 101, 102.

Figure 10:
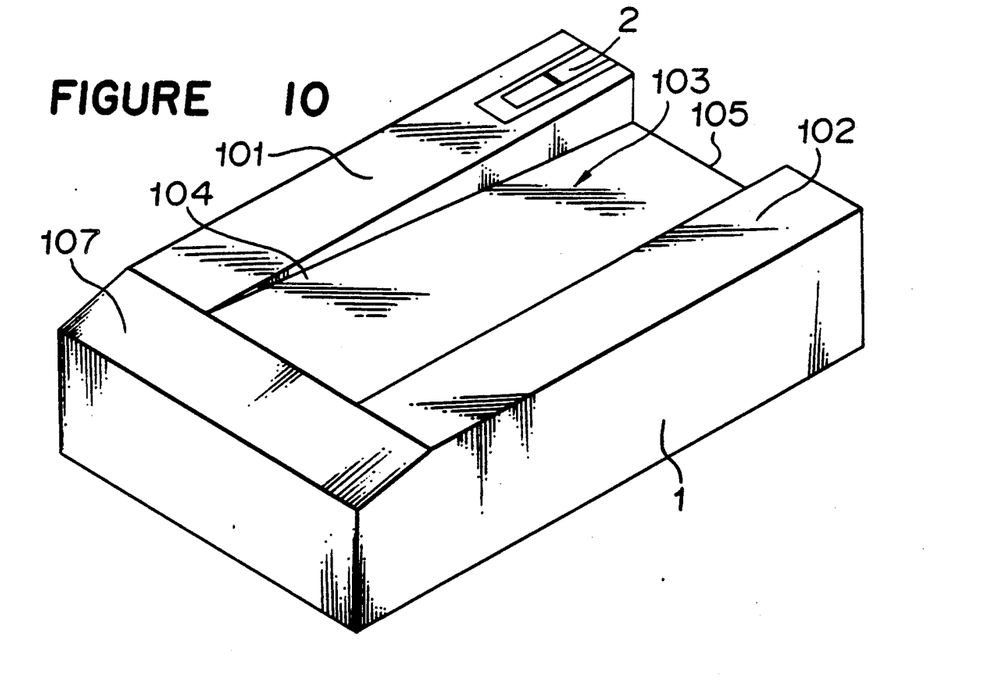

FIG. 10 shows an embodiment wherein the magnetic head with the slider of the present invention is applied to a composite type magnetic head. In FIG. 10, a numeral 2 designates an MIG type reading/writing element.

Besides the description mentioned above, the present invention is applicable to a Winchester type magnetic head provided with a U-shaped core and a coil, a thin film magnetic head having a thin film reading/writing element which is formed by the same process of semiconductor manufacturing technology on the slider, and a metal-in-gap (MIG) type magnetic head.

Further, the present invention is applicable to a contact type wherein the magnetic head is used in combination with a flexible magnetic disk such as a floppy disk and another type such as a flying type wherein the magnetic disk head is used in combination with a hard magnetic disk.

The present invention can be applied in a wide range without any restrictions such as the absence or presence of tapered surface and the number of rail portions.

In accordance with the present invention, a recessed portion can be formed by a shaving means such as a wire saw or a rotating grindstone. Accordingly, a time required for forming the recessed portion for producing a negative pressure is shortened, processability is improved and a large scale production is possible.

Obviously, numerous modifications and variations of the present invention are possible in light of the above teachings. It is therefore to be understood that within the scope of the appended claims, the invention may be practiced otherwise than as specifically described herein.

What is claimed is:

1. A slider, in a magnetic head including the slider and at least one read/write element, for generating a negative pressure region between the slider and an opposing magnetic disk, which comprises:
    an air inflowing side surface at a front end;
    an air outflowing side surface at a rear end;
    a first flat top side surface between the air inflowing and air outflowing ends;
    a second top side surface recessed in said first flat top side surface which includes a flat rear portion connected to said air outflowing side surface, said flat rear portion being at a slant with respect to said first flat top surface and being sloped away from the front end at a predetermined grade, and a front portion that is cylindrically arc shaped.

2. A slider, according to claim 1, which further comprises:

a flat sloped surface between said first flat top surface and said air inflowing side surface which slopes away from said first flat top surface towards said air inflowing side surface.

3. A slider, according to claim 1, wherein:
said flat sloped surface has a rear end portion adjacent to a front end portion of said second top side surface.

* * * * *